United States Patent [19]

Seto

[11] Patent Number: 4,864,283
[45] Date of Patent: Sep. 5, 1989

[54] TEMPERATURE ALARM

[75] Inventor: Kan-Chiu Seto, San Jose, Calif.

[73] Assignee: Tandem Computers, Incorporated, Cupertino, Calif.

[21] Appl. No.: 300,160

[22] Filed: Jan. 23, 1989

Related U.S. Application Data

[63] Continuation of Ser. No. 912,307, Sep. 26, 1986, abandoned, which is a continuation-in-part of Ser. No. 880,390, Jun. 30, 1986, abandoned.

[51] Int. Cl.$^4$ .................. G08B 17/00; G08B 23/00
[52] U.S. Cl. .................. 340/584; 340/502; 340/594; 340/693
[58] Field of Search .................. 340/584–588, 340/593–594, 502–503, 815, 22, 693

[56] References Cited

U.S. PATENT DOCUMENTS

| | | | |
|---|---|---|---|
| 3,893,092 | 7/1975 | Kessler | 340/503 X |
| 3,959,787 | 5/1976 | Messmann et al. | 340/594 X |
| 4,262,288 | 4/1981 | Lanphier, III et al. | 340/674 |
| 4,322,594 | 3/1982 | Brisson | 219/497 |
| 4,549,141 | 10/1985 | Teass, Jr. | 340/502 X |
| 4,596,203 | 6/1986 | Lorek | 116/215 |
| 4,661,804 | 4/1987 | Abel | 340/539 |

Primary Examiner—Glen R. Swann, III
Assistant Examiner—Thomas J. Mullen, Jr.
Attorney, Agent, or Firm—Townsend and Townsend

[57] ABSTRACT

A temperature alarm includes a thermostat for actuating an audible alarm, a control panel-mounted LED and a circuit board-mounted LED. The audible alarm, once actuated by the thermostat, can be temporarily disabled by the user by actuating a disable timer connected to the audible alarm. After a period of time the timer times out to return control of the audible alarm to the thermostat. The panel LED is illuminated continuously while the chosen temperature value is exceeded. The circuit board LED is mounted to a circuit board within the equipment housing. Once illuminated by the thermostat, the circuit board LED remains actuated regardless of the temperature to provide an indication to a service technician that the chosen temperature was exceeded since the last servicing. The circuit board-LED, coupled to a latching relay also mounted to the circuit board, is extinguished by manually resetting the latching relay.

1 Claim, 2 Drawing Sheets

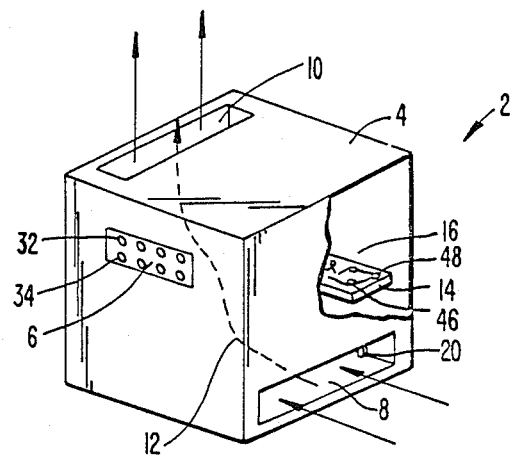
FIG._1.
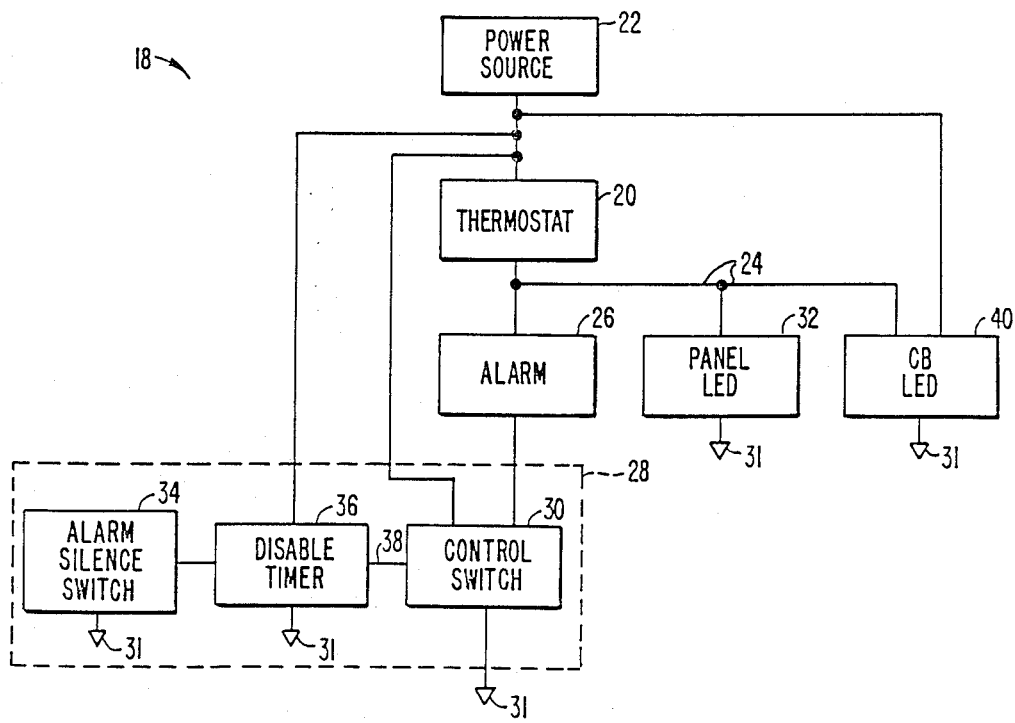
FIG._2.

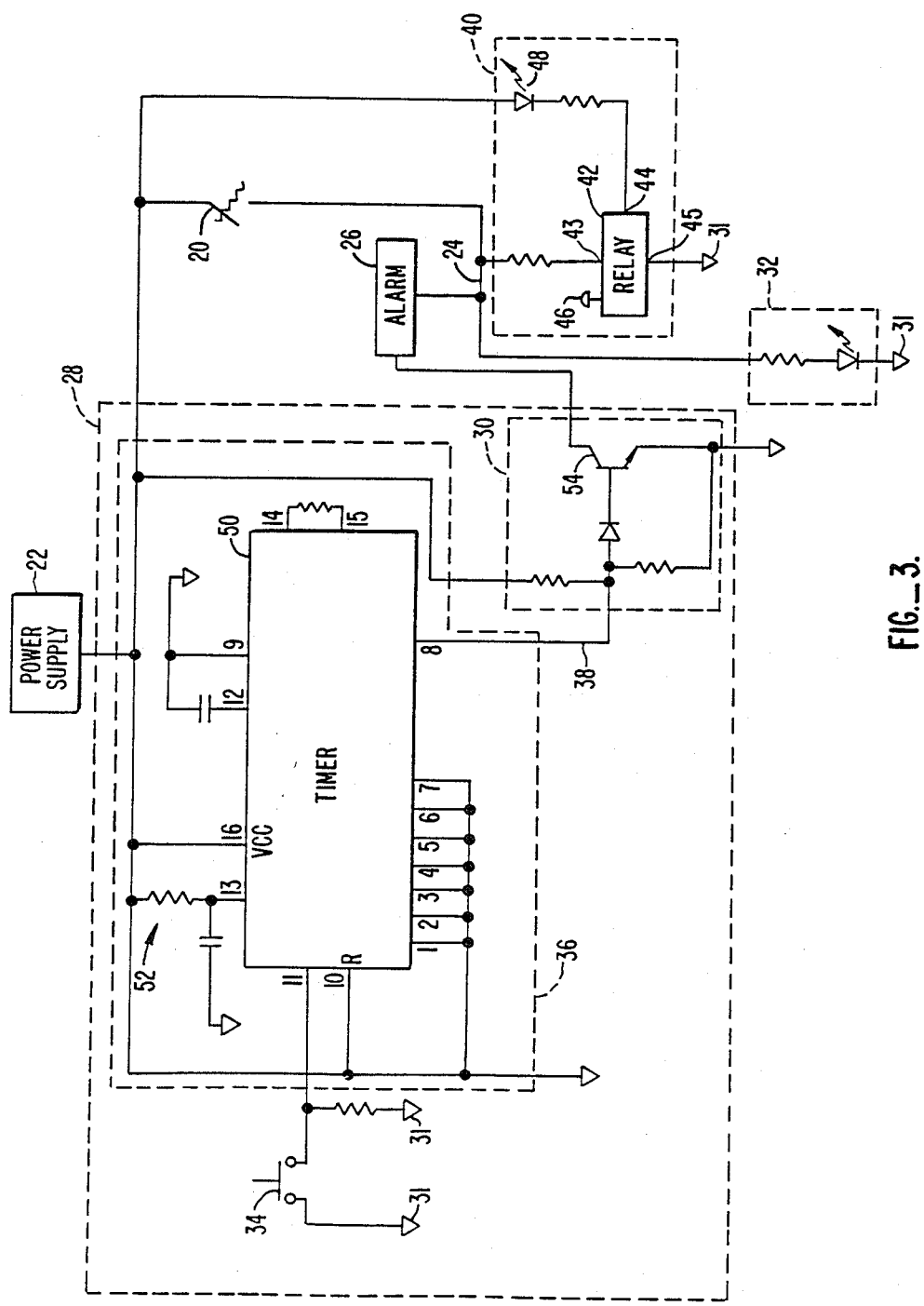
FIG._3.

TEMPERATURE ALARM

This is a continuation of application Ser. No. 912,307 filed Sept. 26, 1986, now abandoned, which is a continuation-in-part of Ser. No. 880,390, filed June 30, 1986, now abandoned.

BACKGROUND OF THE INVENTION

Large computer systems, as well as other electrical equipment, generate great quantities of heat which must be removed from the computer. This is typically done by blowing ambient air through the computer housing from an air inlet in the housing, along an air path within the housing and out an air outlet. One of the problems with conventional forced air cooling systems is that the ambient air temperature often increases because of the heat generated by the computer. Recognizing this, it is quite important that the temperature of the air in entering of the computer housing be sufficiently low to provide proper cooling. If the inlet air temperature exceeds a chosen value, for example 40° C. then, based on the design of the computer, the air may not properly cool the components, which can result in an overheating failure.

SUMMARY OF THE INVENTION

The present invention addresses and solves the problem of providing the user of a computer with adequate warning when the temperature has exceeded a chosen temperature in a manner which permits the over-temperature situation to be taken care of without creating an unacceptable working environment. In addition, the temperature alarm of the invention provides the service technician who subsequently services the computer with a visual indication that the chosen temperature has been exceeded since the computer was last serviced.

The invention is directed to a temperature alarm particularly useful for alerting an operator that a particular temperature has exceeded a chosen level. The alarm includes a temperature sensitive element, such as a thermostat, coupled to a power source. An audible alarm is connected to the thermostat and to a user-visible visual indicator, such as an LED mounted to a control panel.

The alarm, once actuated when the temperature has passed the chosen value, can be temporarily disabled by the user. This disablement is preferably accomplished by the user pressing an alarm silence switch on the control panel which actuates or sets a disable timer connected to a control switch. The disable timer starts to count down from a preselected value upon actuation. While the disable timer remains set, it actuates the control switch which cuts off the audible alarm. Preferably the timer takes about five to ten minutes to count down after which the control switch is deactuated thus allowing the alarm to once again sound. The user can thus temporarily silence the audible alarm while steps are taken to correct the situation. The audible alarm is not permanently silenced but will reactuate if the temperature does not return to an acceptable level by the time the disable timer times out.

The actuation of the disable timer only affects the audible alarm: the visual indicator continues to display the visual indication while the chosen temperature value is exceeded even when the audible alarm is disabled. In addition, a second visual indicator, coupled to the thermostat and the power source. may be used. The second visual indicator, once actuated by the thermostat, remains actuated, regardless of the subsequent changes in the temperature sensed by the thermostat, until manually reset. The second visual indicator is typically an LED mounted to a circuit board within the housing of the computer at a user inaccessible region. Preferably, the circuit board LED includes a mechanically resettable latching relay mounted to the circuit board which connects the circuit board LED to the power source once the thermostat closes and leaves the LED connected to the power source even after the thermostat reopens. In this way the circuit board LED provides an indication to the service technician that sometime since the last servicing of the product the chosen temperature has been exceeded.

A primary advantage of the invention is that the operator is provided instantaneous visual and audible alarms or signals when the chosen temperature has been exceeded. However, a continuously ringing alarm is not necessary, and in fact creates a very unpleasant and thus undesirable working environment. Since the over-temperature situation should not be ignored, as can easily occur with a simple visual indicator, the audible alarm is silenced for only a period of time, for example five or ten minutes, after which it once again sounds. The operator can then resilience the alarm by again pressing the alarm silence switch on the panel. Such an audible reminder helps ensure that the over-temperature condition is not ignored.

The circuit board LED, once luminated by the closing of the thermostat, stays luminated until manually reset by the service technician. The technician can then inquire as to the facts and circumstances surrounding the over-temperature condition which caused the circuit board LED to illuminate. By using a mechanical latching relay to connect the circuit board LED to the source of power, even if the entire computer, including the temperature alarm, is disconnected from the source of power, once reconnected the circuit board LED will luminate for the technician to see.

Other features and advantages of the present invention will appear from the following description in which the preferred embodiment has been set forth in detail in conjunction with the accompanying drawings.

BRIEF DESCRIPTION OF THE DRAWINGS

FIG. 1 is an overall view showing a computer, in which the temperature of the air entering the computer housing is monitored by a temperature alarm made according to the invention.

FIG. 2 is a block diagram of a temperature alarm made in according to the invention.

FIG. 3 is a detailed schematic diagram of the temperature alarm of FIG. 2.

DETAILED DESCRIPTION OF THE PREFERRED EMBODIMENT

Referring now to FIG. 1, a computer 2 is shown to include a housing 4 to which a control panel 6 is mounted at a user-accessible position. Housing 4 includes an air inlet 8, an air outlet 10 and an air path 12 connecting the two. Air is moved along air path 12 in a conventional manner by fans, not shown. A circuit board 14 is mounted to a user-inaccessible position 16 within housing 4.

Referring now also to FIG. 2, a temperature alarm 18 is seen to include a thermostat 20 electrically connecting a power source 22 and a common line 24. Thermostat 20 is mounted along air path 12 adjacent to air inlet 8. An audible alarm 26 is electrically connected between common line 24 and an alarm disable assembly 28. Alarm disable assembly includes a normally closed control switch 30 connecting alarm 26 and ground 31. Thus when thermostat 20 closes, which occurs when temperature at air inlet 8 exceeds a chosen value, for example 40° C. power source 22 is connected to alarm 26 through thermostat 20 and control switch 30 so to sound the audible alarm thus notifying the operator that the air used to cool computer 2 is too warm.

In addition to audible alarm 26, a first visual indicator in the form of a panel light emitting diode (LED) 32 is connected between common line 24 and ground 31. Panel LED 32 is mounted to panel 6 to provide the operator with a visual indication of the excessive temperature at air inlet 8 in addition to the audible indication provided by alarm 26.

Since the constant ringing of alarm 26 is at best annoying, alarm disable assembly 28 is used to temporarily shut off alarm 26 by opening its control switch 30 for a period of time. To do so, the operator presses an alarm silence switch 34 located on panel 6. Switch 34 is connected to a disable timer 36 of assembly 28 which acts to provide a disable signal along a line 38 which opens control switch 30. When disable timer 36 provides the disable signal along line 38 it also starts counting down for a period of time, for example five to ten minutes, after the period of time the disable signal along line 38 is removed to once again closed control switch 30. If thermostat 20 is still closed at the end of this period of time, alarm 26 once again sounds. The user must then manually press switch 34 to shut off alarm 26 and start disable timer 36 counting down again. This feature ensures that the over-temperature situation is not easily ignored.

A second visual indicator in the form of a circuit board LED 40 is connected to both common line 24 and power source 22. Circuit board LED 40 is mounted to circuit board 14 at user-inaccessible position 16. Turning now also to FIG. 3, circuit board LED 40 is seen to include a manually resettable relay 42 having a terminal 43 connected to common line 24 and a terminal 45 connected to ground 31. Relay 42 includes a normally open terminal 44 which becomes electrically connected to ground 31 upon closing of thermostat 20 which causes the energization of terminal 43. Relay 42 is a latching type relay which must be manually reset by pressing a button 46 on relay 42 to once again open the circuit between terminals 44 and 45. Terminal 44 is electrically connected to an LED 48 physically mounted to circuit board 14. LED 48 is connected to power source 22 so that once relay 42 has been actuated, closing the circuit between terminals 44 and 45, LED 48 is luminated and stays luminated until button 46 is pressed regardless of a subsequent opening or closing of thermostat 20. Thus, once thermostat 20 has closed for any reason, this will be indicated to a service technician inspecting circuit board 14 while working on computer 2.

Disable timer 36 includes a timer 50. such as one made by Texas Instrument of Texas and identified as UA2240CN. Timer 50 is connected in a conventional fashion and includes an RC circuit 52 at pin 13 to control how long it takes timer to count down. Normally, that is when timer 50 is not set and therefore not counting down, timer 50 provides a high signal at pin 8 connected to line 38 which cases a transistor 54, which acts as the switch element of control switch 30, to provide a closed circuit between alarm 26 and ground 31. However once switch 34 is momentarily pressed, timer 50 becomes set and provides a low signal to line 38 thus causing transistor 54 to open thus opening the circuit between alarm 26 and ground 31 through the collector and emitter of the transistor. Only after timer 50 has timed out, which is determined by the values of the components in RC circuit 52, does pin 8 again go high so to switch transistor 54 on so that alarm 26 can again provide its audible alarm, assuming thermostat 20 is closed.

The remaining specific electrical elements shown in FIG. 3 will not be described in detail because they are well within the skill of one of ordinary skill in the art.

In use, assume the temperature at air inlet 8 is below the chosen temperature, thermostat 20 is opened, control switch 30 is closed, and alarm 26, panel LED 32 and circuit board LED 40 are off. When the temperature at air inlet 8 rises sufficiently to close thermostat 20 alarm 26 will sound and control switch 30 will remain closed. Panel LED 32 and circuit board LED 40 will both become luminated. If the operator wishes to silence alarm 26 switch 34 is depressed which causes disable timer 36 to provide a low signal on line 38 to open control switch 30 and shut off alarm 26. Panel LED 32 and circuit board LED 40 both remain luminated. (a) Assuming the temperature remains elevated so that thermostat 20 remains closed when the disable timer times out, disable timer 36 again provides a high level signal along line 38 to control switch 30 so that control switch 30 closes to reactuate alarm 26 while panel and circuit board LED's 32, 40 remain luminated. (b) Assuming that the temperature at air inlet 8 has dropped below the chosen temperature so that thermostat 20 is open when disable timer 36 times out, control switch 30 is once again closed; however alarm 26 remains silent because of the opening of thermostat 20. Panel LED is no longer luminated for the same reason. However, LED 48 of circuit board LED 40 remains luminated until a service technician presses button 46 to reset relay 42.

Modification and variation can be made to the disclosed embodiment without departing from the subject of the invention as defined in the following claims. Temperature alarm 18 can be used with the products and equipment other than computers. Thermostat 20 can be used to sense the temperature of solids or fluids the fluids being stationary or in motion. Thermostat 20 can be used to actuate when the temperature being sensed drops below a chosen temperature as well as above a chosen temperature. If desired, alarm disable assembly 28 could be positioned between common line 24 and alarm 26 rather than between alarm 26 and ground. Temperature sensitive elements other than thermostat 20 can be used in place of the thermostat.

What is claimed is:

1. A temperature alarm for use with equipment of the type having a housing with an external display panel and a user-inaccessible region therein, the alarm comprising:
   a power source;
   a temperature-sensitive element, coupled to the power source, for providing a temperature signal when the temperature at said element is past a chosen value;
   alarm means, coupled to the temperature-sensitive element, for providing an audible alarm when the temperature-sensitive element provides the temperature signal;

first visual indicator means, coupled to the temperature-sensitive element, for providing the user a visual indication at the display panel that the temperature is past the chosen value;

a user-actuated alarm disable means at the display panel, coupled to the alarm means, for selectively temporarily disabling the alarm means for a period of time and thereafter re-enabling said alarm means; and a second visual indicator means, housed within the housing at the user-inaccessible region, coupled to the temperature-sensitive element and the power source, for continuously providing a second visual indication once the temperature-sensitive element has provided the temperature signal, the second visual indicator means including a user-actuated reset means for resetting the second visual indicator means so to halt the provision of the second visual indication after the temperature-sensitive element is no longer providing the temperature signal;

the visual indication provided by the first and second visual indicator means being independent of whether the alarm means is selectively temporarily disabled by the user-activated alarm disable means.

* * * * *